J. BEARD.
Steam-Plow.
No. 204,790. Patented June 11, 1878.
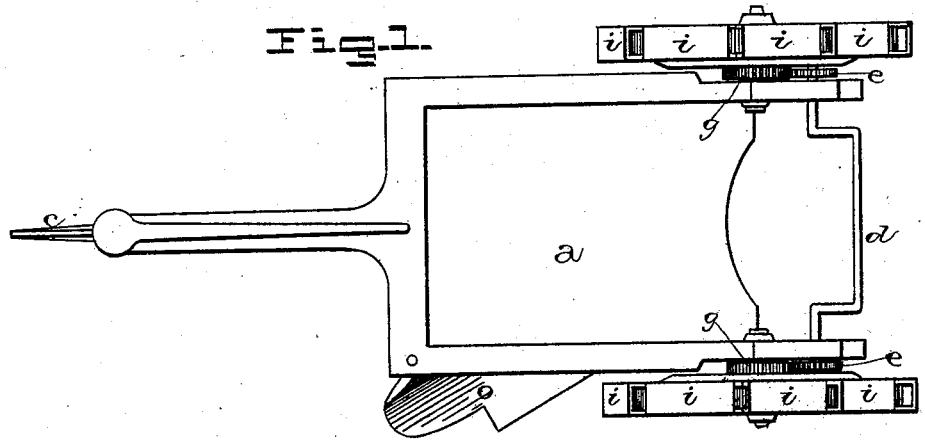
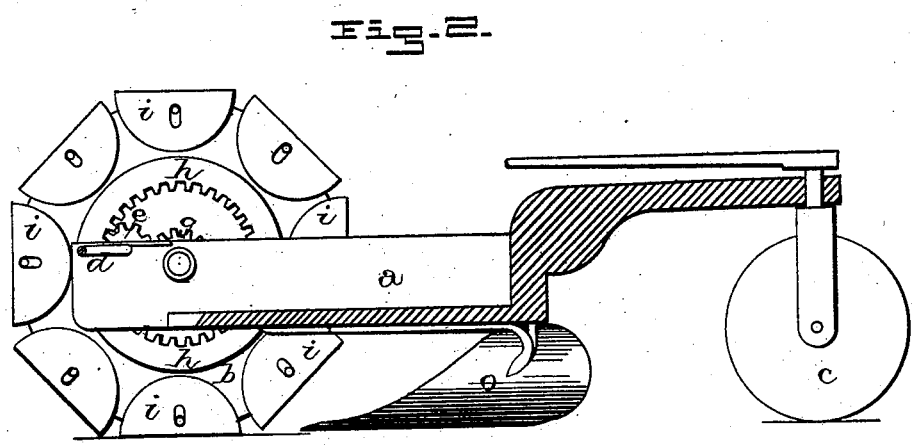
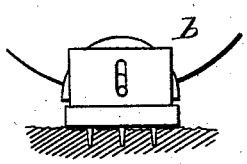

UNITED STATES PATENT OFFICE.

JAMES BEARD, OF KENT, IOWA.

IMPROVEMENT IN STEAM-PLOWS.

Specification forming part of Letters Patent No. 204,790, dated June 11, 1878; application filed April 15, 1878.

*To all whom it may concern:*

Be it known that I, JAMES BEARD, of Kent, in the county of Union and State of Iowa, have invented certain new and useful Improvements in Steam-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in steam-plows; and it consists in the arrangement and combination of parts, whereby the body, having the plows secured to its under side, is moved readily and easily over the ground, and can be turned around in any direction, as will be more fully described hereinafter.

Figure 1 is a plan view of my invention. Fig. 2 is a vertical section of the same. Fig. 3 is a detail view of a modification.

$a$ represents a suitable frame-work, upon which the engine is placed, and which frame is supported upon the two driving-wheels $b$ and a caster-wheel, $c$, at the rear end. This caster-wheel $c$ has a lever connected to it, by means of which the engine is guided in any desired direction. The engine that is to be used in driving this machine may be of any construction that may be preferred, as this forms no part of my invention. This engine is connected, in any desired manner, with the crank-shaft $d$, which extends across the frame, and has a pinion, $e$, placed upon each end. This pinion meshes with the cog-wheels $g$, which are secured to the inner ends of the hubs of the wheels $b$, so that when motion is imparted to the shaft by means of the engine the wheels $b$ will be made to revolve and draw or force the machine along.

Upon the inner side of each of the wheels $b$ is formed an internal gear, $h$, with which the pinions may be made to gear for the purpose of turning the engine quickly and sharply around. By throwing one pinion in gear with one of the internal gears $h$, while the other pinion forces the engine ahead, one wheel may be made to back while the other moves along, thus causing the engine to turn almost upon its own axes.

In order to make the wheels $b$ adapt themselves to all inequalities of the earth, both hard and soft ground, there are secured to the edges of the wheel a number of shoes, $i$, each one of which is made U-shaped, so as to straddle over the edge of the wheel, and has a slot in each of its sides, so as to allow it a free adjustability upon the pivots by which it is held as the wheel moves forward over the ground. Each one of these shoes being separate and independent, as the wheel turns they each adjust themselves to the ground, so as to give the wheel a broad firm tread, and thus enable it to take such a hold upon the ground as will enable the engine to carry the machine along with ease and rapidity. Where shoes are not used the edges of the wheel sink so deeply into the mud and soft ground as to clog and impede the forward progress of the machine.

By slotting the shoes upon their sides it will be seen that each one is allowed the freest play, so that each one will adjust itself to the formation of the ground without the help of any other device. Should a plain shoe (like what is here shown) be found inadequate to carry the machine over plowed or other soft ground, to the under side of each shoe will be attached a block of wood or other suitable material, and from this block will project spurs, knives, or other suitable devices, by means of which a hold will be taken upon the ground that will enable the engine to force the machine along, however soft and unequal the ground may be.

This engine is to be used not only for drawing loads along the road, but for plowing and all sorts of agricultural work. When used for plowing, plows without any land-side will be used, as shown. In this case the plows $o$ will consist of nothing but a mold-board and a suitable standard, made in one or more pieces, for the purpose of fastening it to the frame $a$. As here shown, the standard is formed of two separate and distinct bars, one of which extends vertically through the frame $a$, while the other extends along under the bottom of the frame, so as to act as a brace. By dispensing with the land-side of the plow the plow acts just as well, being supported by the frame from above, while it decreases the friction to a very great extent, thus enabling the engine to move forward with greater ease and rapidity.

Having thus described my invention, I claim—

In a steam-plow, the combination of the frame $a$, having the plow $o$ secured to its under side, with the driving-wheels $b$, having the movable shoes $i$ around its periphery, and the internal gears $h$, secured to their inner sides, crank-shaft $d$, movable pinions $e$, and spur-wheels $g$, substantially as shown and described.

In testimony that I claim the foregoing I have hereunto set my hand this 2d day of April, 1878.

JAMES BEARD.

Witnesses:
S. F. SPURRIER,
H. A. TAYLOR.